(12) United States Patent
Nonomura et al.

(10) Patent No.: US 6,731,346 B1
(45) Date of Patent: May 4, 2004

(54) TELEVISION RECEIVER

(75) Inventors: Takaya Nonomura, Higashiosaka (JP); Kiyoshi Awano, Hirakata (JP); Tadashi Shiono, Osaka (JP); Yoshinori Hama, Kyoto (JP); Masako Wakisaka, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/355,630

(22) PCT Filed: Feb. 17, 1998

(86) PCT No.: PCT/JP98/00659

§ 371 (c)(1),
(2), (4) Date: Nov. 2, 1999

(87) PCT Pub. No.: WO98/37693

PCT Pub. Date: Aug. 27, 1998

(30) Foreign Application Priority Data

Feb. 19, 1997 (JP) .............................................. 9-034506
Mar. 31, 1997 (JP) .............................................. 9-080214

(51) Int. Cl.[7] .................................................. H04N 3/27
(52) U.S. Cl. ........................ 348/554; 348/558; 348/730; 348/725
(58) Field of Search ................................. 348/554, 558, 348/563, 730, 725, 729, 735; 345/211, 210, 212, 214

(56) References Cited

U.S. PATENT DOCUMENTS 3,795,762 A * 3/1974 Willis ........................ 178/5.4
5,389,952 A * 2/1995 Kikinis ........................ 345/212
5,673,088 A * 9/1997 Nah ............................ 348/555
5,703,993 A * 12/1997 Kondo et al. ................. 386/35
5,808,693 A * 9/1998 Yamashita et al. ........... 348/554
5,926,228 A * 7/1999 Jeon et al. ................... 348/554
5,956,098 A * 9/1999 Mizukami et al. ........... 348/735
6,020,910 A * 2/2000 Schmidt et al. .............. 348/5.5
6,092,206 A * 7/2000 Choi ........................... 713/320
6,115,033 A * 9/2000 Choi ........................... 345/211
6,275,221 B1 * 8/2001 Song .......................... 345/211

FOREIGN PATENT DOCUMENTS

| JP | 4-20778 | 2/1992 |
| JP | 6-268936 | 9/1994 |
| JP | 7-99776 | 4/1995 |
| JP | 8-98105 | 4/1996 |
| JP | 8-298636 | 11/1996 |

* cited by examiner

*Primary Examiner*—John Miller
*Assistant Examiner*—Paulos Natnael
(74) *Attorney, Agent, or Firm*—Armstrong, Kratz, Quintos, Hanson & Brooks, LLP

(57) ABSTRACT

A television including a CS digital circuit to receive a CS digital television broadcast signal. A micom circuit detects a broadcast mode of the digital television broadcast. Where the broadcast mode is in a first mode, or usual broadcast mode, the power supply to a video output section and audio output section, for example, is turned on to output video images and sound respectively through a CRT and a speaker. Also, where the broadcast mode is in a second mode, or radio broadcast mode, the power supply to the video output section is turned off. Where the broadcast mode is in a third mode, or data broadcast mode, the power supply to both the image output section and the audio output section is turned off.

4 Claims, 19 Drawing Sheets

FIG. 8

82 →(1) USE CS BROADCAST (2) NOT USE CS BROADCAST

FIG. 17(A)

| 12:00 - 13:00 | AAA VIEW SCHEDULING |
| 15:00 - 16:00 | BBX VIEW+RECORD SCHEDULING |
| 17:00 - 17:30 | AXC RECORD SCHEDULING |

FIG. 17(B)

SCHEDULING MODE

▲ GROUND WAVE SCHEDULING

△ C S SCHEDULING

FIG. 17(C)

GROUND WAVE SCHEDULING

17:00 - 17:30  8CH

12:00 - 13:00  10CH

TELEVISION RECEIVER

BACKGROUND OF THE INVENTION

1. Field of the Invention

This invention relates to television receivers. More particularly, the invention relates to a television receiver capable of receiving digital television broadcast signals and analog television broadcast signals, including those over a channel to display images on the display as in a usual broadcast as well as a channel not to display images on the display as in a data broadcast.

2. Description of the Related Art

The digital television broadcast signals include a radio broadcast channel to broadcast only audio sound and a data broadcast channel to broadcast data such as computer programs, in addition to usual broadcast channels for both the video and audio broadcasts. Consequently, if a television receiver which is to receive a digital television broadcast signal selects a usual broadcast channel, video images-and audio sound are respectively outputted through the display and the speaker. If a radio broadcast channel is selected, audio sound is outputted through the speaker. If a data broadcast is received, outputted is data through a communication port (interface) onto a personal computer. In such a television receiver, if the power to the display is kept on even during receiving a radio or data broadcast, useless power consumption results.

Therefore, it is a primary object of this invention to provide a novel television receiver.

It is another object of the present invention to provide a television receiver which can prevent useless power consumption when receiving a digital television broadcast signal.

It is a further object of the present invention to provide a television receiver which is well suited for a digital television broadcast program scheduling system and which is capable of reducing consumption of power.

SUMMARY OF THE INVENTION

A television receiver according to the present invention, comprises: a first receiving means for receiving a digital television broadcast signal; a video output means for outputting a video image in response to the television broadcast signal received by the first receiving means; a detecting means for detecting a broadcast mode of the digital television broadcast signal received by the first receiving means; and a first control means for enabling or disabling the video output means depending upon the broadcast mode detected by the detecting means.

Specifically, where the broadcast mode includes a first mode including a video signal and a second mode not including a video signal, the first control means including first off means for turning off a power supply for the video output means when the detecting means detects the second mode.

A television receiver, further comprises: an audio output means for outputting audio sound in response to the television broadcast signal received by the first receiving means; and a second control means for enabling or disabling the audio output means depending upon the broadcast mode detected by the detecting means.

According to the present invention, the first control means enables or disables the video output means according to a mode detected by the detecting means. Where the broadcast mode of a digital television broadcast signal being received is in the first mode, the power, for example, to a display and speaker is turned on to output a video image and an audio sound respectively through the display and the speaker. Also, where the broadcast mode of a digital television broadcast signal is in the second mode, the power to the display is turned off. Where the broadcast mode of a digital television broadcast signal is in the third mode, the power to both the display and speaker is turned off. Consequently, according to the present invention, it is possible to prevent against useless power consumption because the power to the video output means and the audio output means is turned on/off according to a broadcast mode detected.

In one aspect, a television receiver further comprises: a second receiving means for receiving an analog television broadcast signal; a receiving mode setting means for setting as to whether to receive the digital television broadcast signal or the analog television broadcast signal; and a third control means for disabling the first receiving means when the receiving mode setting means made a setting to receive the analog television broadcast signal.

In another aspect of the present invention, a television receiver is capable of plotting a scheduling for a digital television broadcast program, comprising: a digital broadcast signal receiving means for receiving a digital broadcast; an external output means for externally outputting the digital broadcast signal received by the digital broadcast signal receiving means; a display means for displaying a video image of the digital broadcast signal; a power supply means for supplying power to each circuit of the television receiver; a reception scheduling means for scheduling to receive the digital broadcast; and a control means for controlling power to be supplied from the power supply means to the display means when receiving a digital broadcast according to a scheduling by the reception scheduling means.

A television receiver with this scheduling function, further comprises an audio output means to output an audio signal of the digital broadcast signal, wherein the control means controls the power to be supplied from the power supply means to the audio output means when a digital broadcast is received according to a scheduling by the reception scheduling means.

Specifically, the control means causes the power supply means to supply power to the digital broadcast receiving means, the display means and the audio output means when a scheduling to view a digital broadcast is set in the reception scheduling means to receive a digital broadcast according to the scheduling. Also, the control means causes the power supply means to supply power to the digital broadcast receiving means, the display means and the audio output means and outputs a digital broadcast signal for enabling recording to the external output means when a scheduling to view a digital broadcast signal and a scheduling to record same are set in the reception scheduling means to receive a digital broadcast according to the scheduling. Further, the control means causes the power control means to cut off power to the display means and the audio output means and outputs a digital broadcast signal for enabling recording to the external output means when a scheduling to record a digital broadcast is set in the reception scheduling means to receive a digital broadcast according to the scheduling.

A television receiver according to another aspect of the present invention, comprises: a digital broadcast receiving means for receiving a digital broadcast; an analog broadcast signal receiving means for receiving an analog broadcast; an external output means for outputting a digital broadcast signal received from the digital broadcast signal receiving means; a display means for displaying video images of the digital broadcast signal and the analog broadcast signal; a power supply means for supplying power to each circuit of the television receiver; a reception scheduling means for scheduling to receive the digital broadcast; and a control means for controlling power to be supplied from the power supply means to the display means when receiving a digital broadcast according to a scheduling by the reception scheduling means.

A television receiver, further comprises an audio output means to output an audio signal of the digital broadcast signal and the analog broadcast signal, wherein the control means controls power to be supplied from the power supply means to the audio output means when a digital broadcast is received according to a scheduling by the reception scheduling means.

Specifically, the control means causes the power supply means to supply power to the digital broadcast receiving means, the display means and the audio output means when a digital broadcast is received according to a scheduling to view a digital broadcast is set by the reception scheduling means. The control means causes the power supply means to supply power to the digital broadcast receiving means, the display means and the audio output means and outputs a digital broadcast signal for enabling recording to the external output means when a digital broadcast is received according to schedulings to view and record a digital broadcast set by the reception scheduling means. The control means causes the power supply means to cut off power to the analog means, the display means and the audio output means and outputs a digital broadcast signal for enabling recording to the external output means when a digital broadcast is received according to a scheduling to record a digital broadcast set by the reception scheduling means.

According to the present invention, when a digital broadcast program is recorded by a VTR or the like, no power is uselessly supplied to unnecessary circuits, thus offering an effect of significantly reducing consumption of power. For a television receiver to receive a digital or analog broadcast, where any of the broadcasts is received and recorded onto a VTR or the like, no power is supplied to a circuit of the receiving section not in signal reception. This can greatly reduce power consumption for a television receiver incorporating a plurality of receiving sections.

Furthermore, it is possible to reduce power consumption on the video recording apparatus, by automatically implement a record scheduling start and end from a television receiver to a video recording apparatus such as a VTR.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 8 is an illustrative view showing a menu to be displayed on a display;

FIG. 17 is an illustrative view showing a screen display state in the FIG. 13 embodiment;

DETAILED DESCRIPTION OF THE PREFERRED EMBODIMENT

Figure 1:
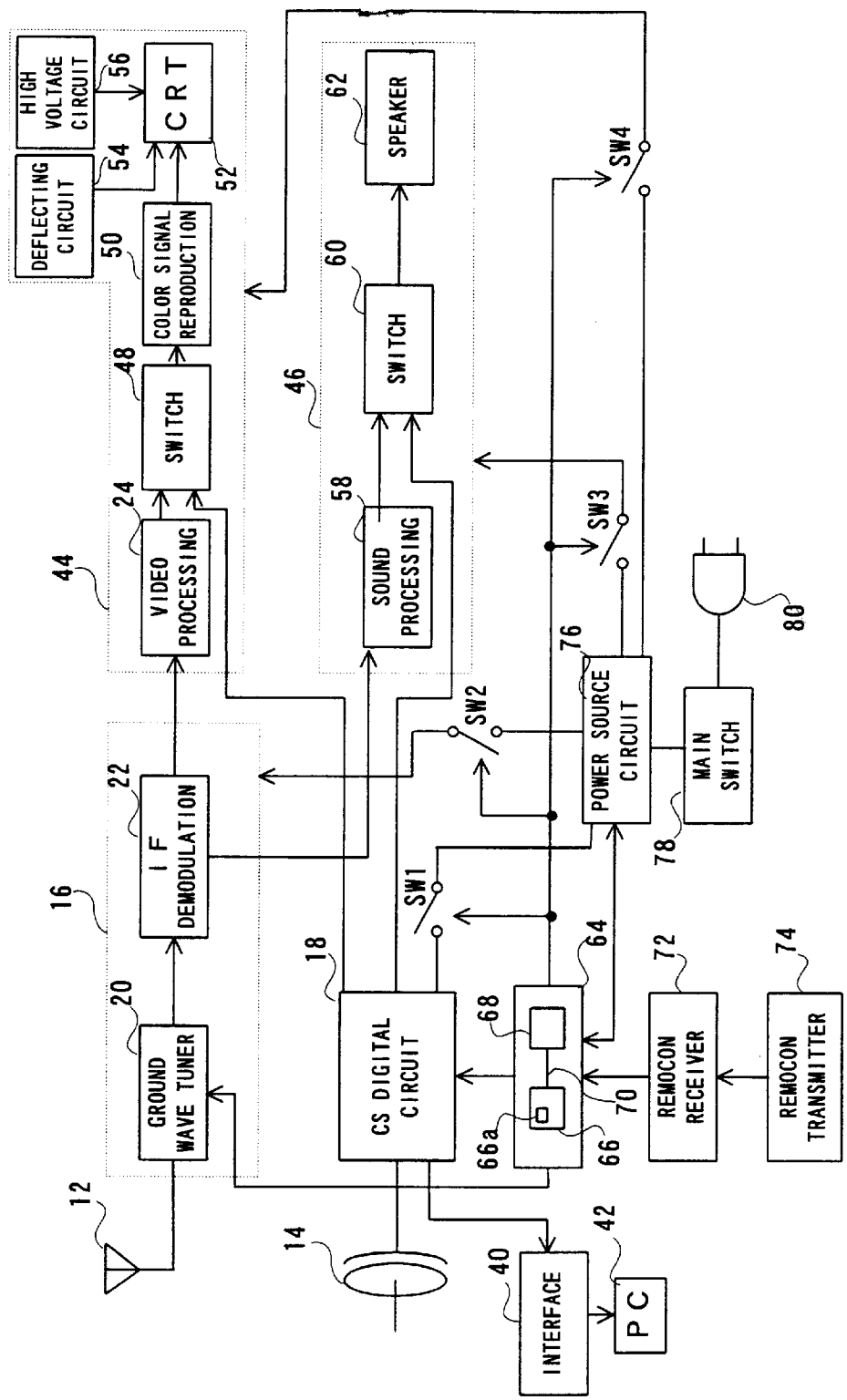
FIG. 1 is a block diagram showing one embodiment of this invention.

Referring to FIG. 1, a television receiver 10 of this embodiment includes an antenna 12 to receive a ground wave broadcast and an antenna 14 to receive a CS (Communication Satellite) broadcast. Incidentally, the embodiment below explanations will be provided regarding a CS digital television broadcast as one example of a digital television broadcast. However, it should be pointed out that this invention is applicable to a television receiver which can receive an arbitrary digital television broadcast, such as a BS (Broadcasting Satellite) digital broadcast or ground wave digital broadcast.

Figure 2:
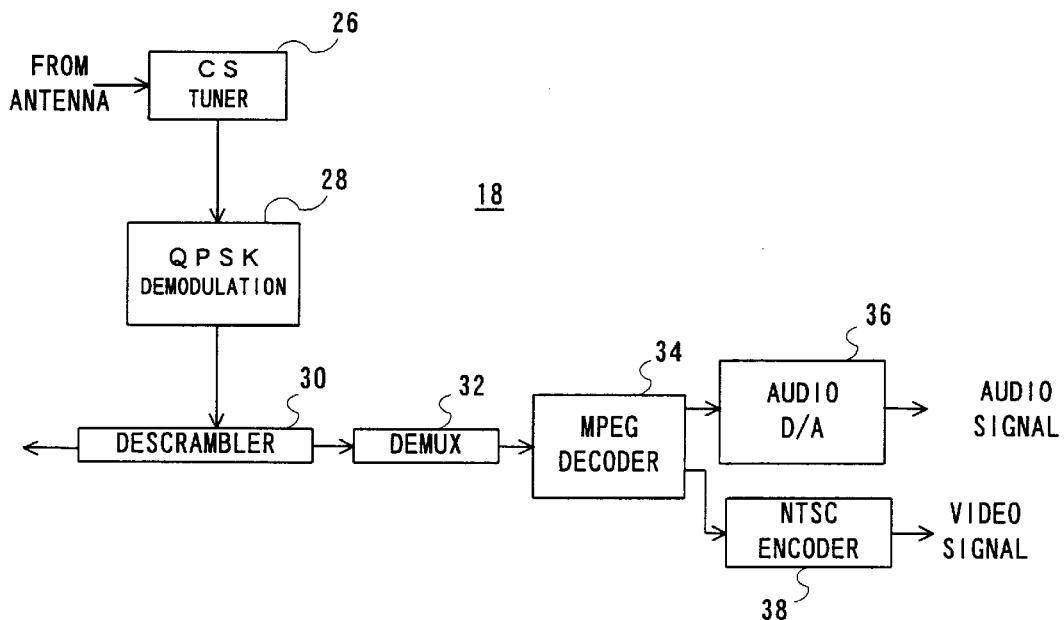
FIG. 2 is a block diagram showing a CS digital circuit.

A ground wave broadcast signal received by the antenna 12 is supplied to a ground wave tuner 20 included in a ground wave receiving circuit 16. As a result of this, a desired channel broadcast signal is selected, and an IF signal on the channel is demodulated by an IF demodulating circuit 22. Meanwhile, a CS broadcast received by the antenna 14 is supplied to a CS tuner 26 shown in FIG. 2. As a result of this, a selected desired channel of a broadcast signal is processed sequentially by a QPSK demodulating circuit 28, a descrambler 30 and a demultiplexer 32. An MPEG decoder 34 creates audio data and video data based on an output from the demultiplexer 32. The audio data is converted into an analog audio signal by an audio D/A converter 36, while the video data is converted into a video signal (luminance signal and chrominance signal) with an NTSC format by an NTSC encoder 38.

Incidentally, the CS broadcast includes a radio broadcast to broadcast only audio sound and a data broadcast channel to broadcast data such as computer programs, besides a usual broadcast channel to broadcast both images and sound. When the CS tuner 26 selects a data broadcast channel, the data included on the channel is outputted from the descrambler 30 via an interface 40 onto a personal computer 42. Also, when the CS tuner receives a radio broadcast channel, the MPEG decoder 34 outputs only audio data.

A video signal processing circuit 24 included in a video output circuit 44 receives a color video signal demodulated by the IF demodulating circuit 22 and creates luminance and chrominance signals. A switch 48 selects either luminance or chrominance signals from the video signal processing circuit 24 or luminance and chrominance signals from a CS digital circuit 18, and supplies them to a color signal reproducing circuit 50. The color signal reproducing circuit 50 reproduces an RGB signal which is deflected in a CRT to which a high voltage is applied by a high voltage circuit 56, wherein a desired video image is displayed.

Meanwhile, the audio signal demodulated by the IF demodulating circuit 22 is processed by an audio signal processing circuit 58 and then supplied to a switch 60. The switch 60 selects either an audio signal from the audio signal processing circuit 58 or an audio signal from the CS digital circuit 18, and supplies it to a speaker 62. Accordingly, a ground wave or CS broadcast audio sound is outputted through the speaker 62.

Figure 3:
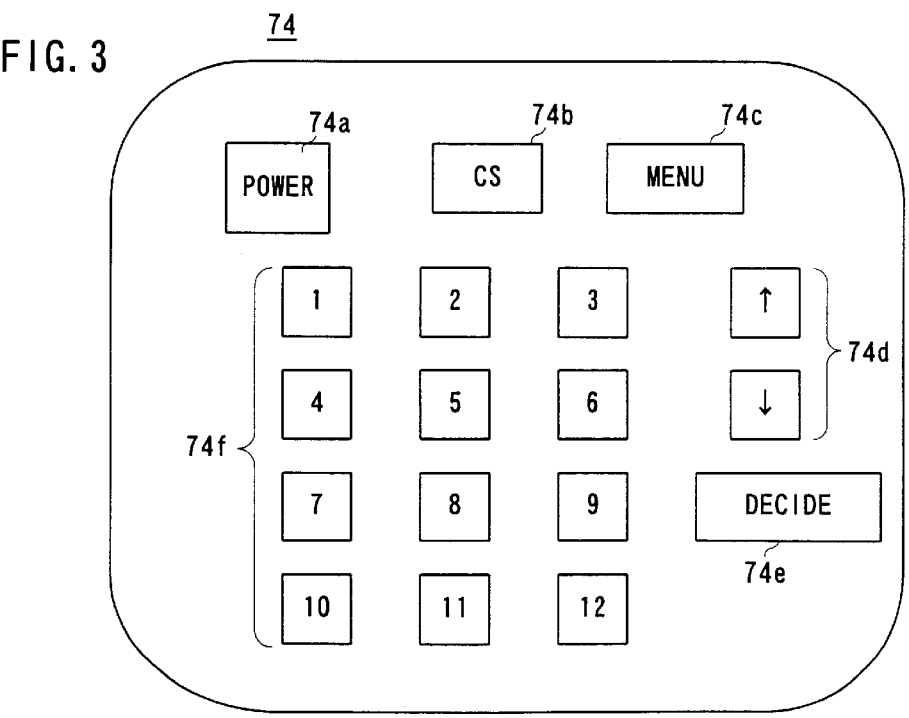
FIG. 3 is an illustrative view showing a remocon transmitter.

When a plug receptacle 80 is connected to a power supply and a main switch 78 is on, electric power is supplied through a power circuit 76 to a micom (micro-computer) 64. At this time, if a remocon (remote controlled) transmitted 74 arranged with various keys as shown in FIG. 3 is operated, a remocon receiver 72 receives an infrared lay signal from the remocon transmitter 74 and supplies key input data to a system controlling micro-computer (syscon micom) 66 and to a channel select micom 68 included in a micom circuit 64. The syscon micom 66 causes switches SW1–SW4 to turn on/off depending upon broadcast mode information sent from the channel select micom 68 though a bus 70. Also, the channel select micom 68 selects a desired channel, according to a key input signal and flag information from the syscon micom 66.

Figure 4:
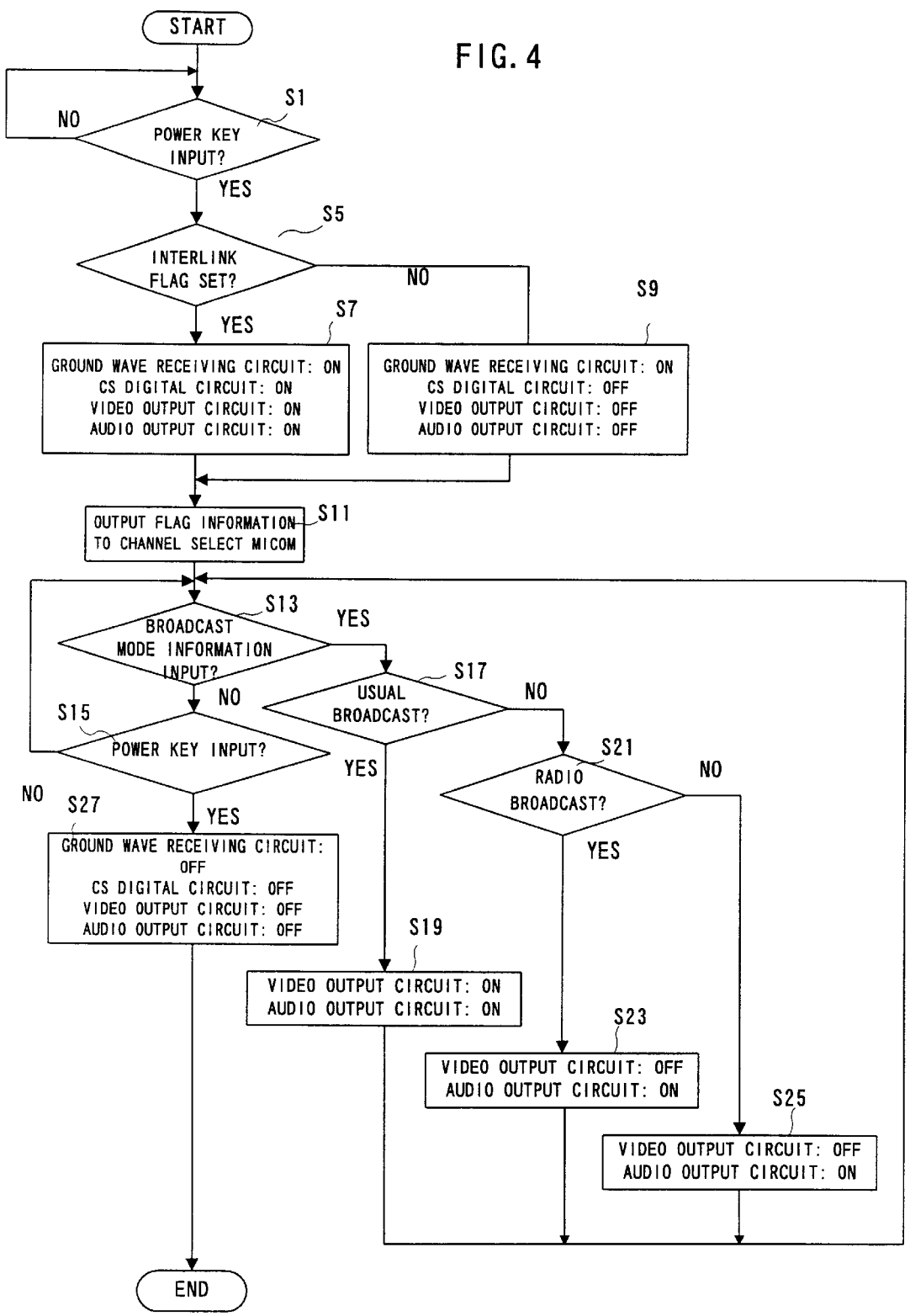
FIG. 4 is a flowchart showing a processing in a syscon micom.
Figure 5:
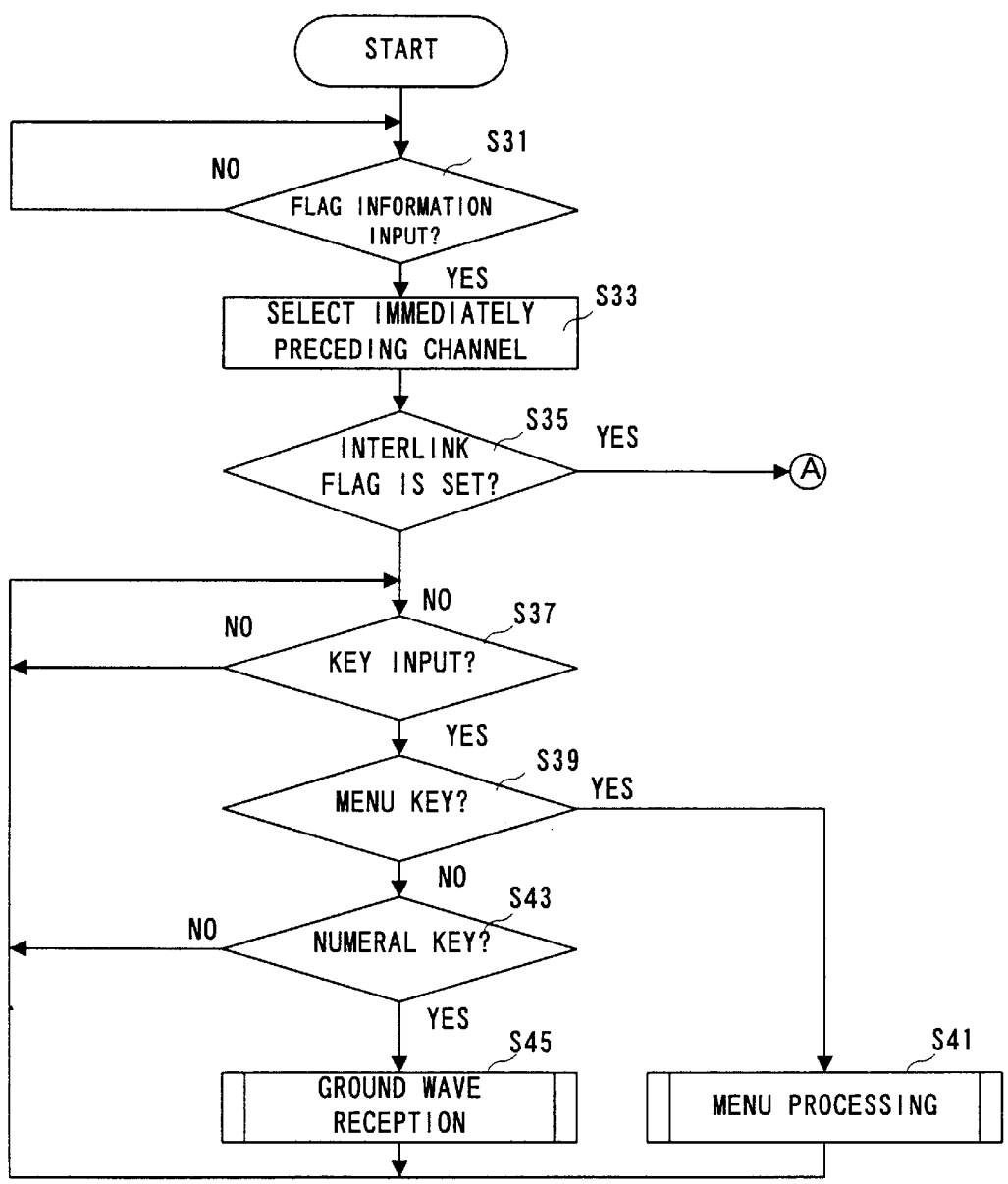
FIG. 5 is a flowchart showing one part of an operation of channel select micom.
Figure 6:
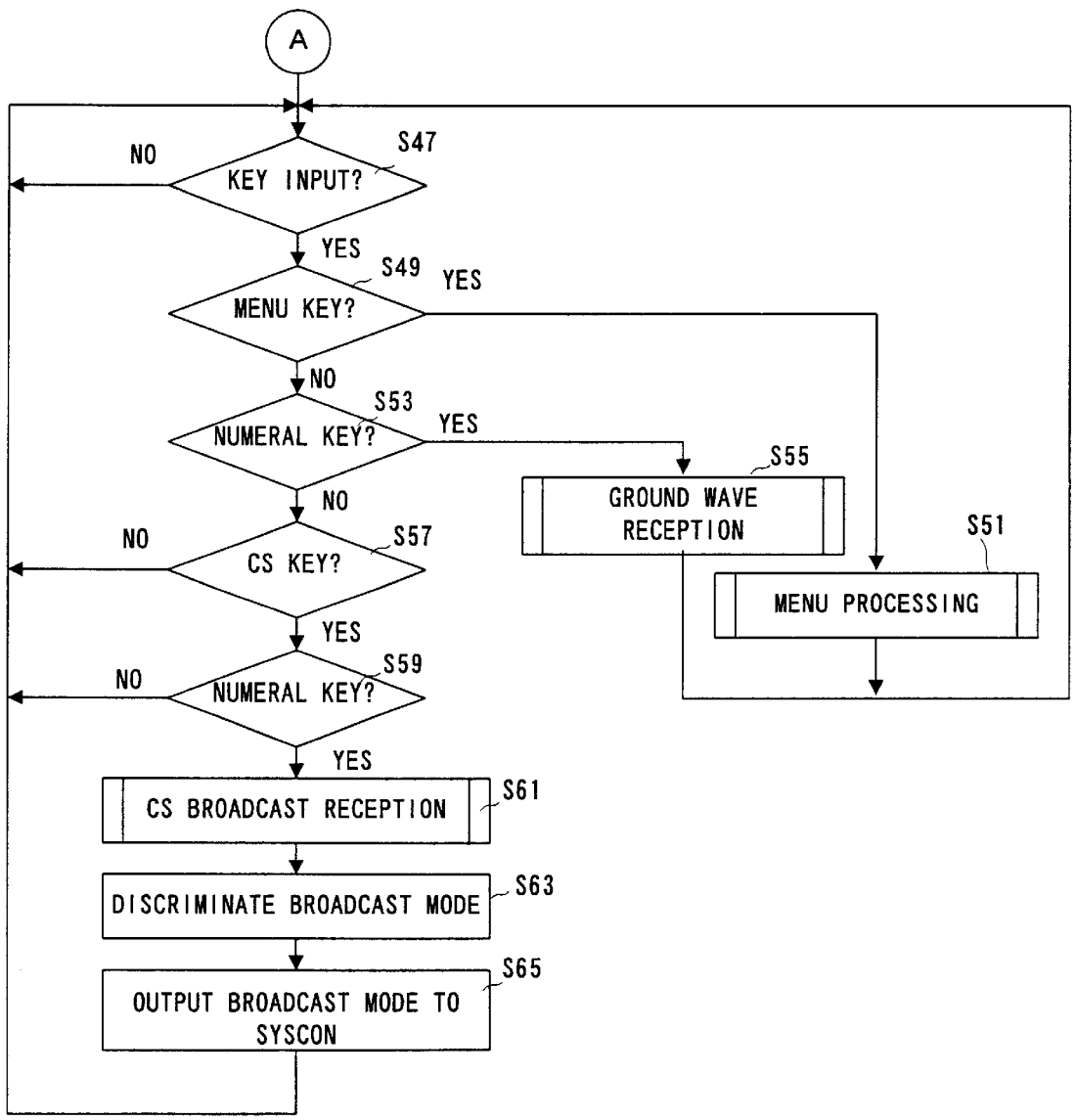
FIG. 6 is a flowchart showing another part of the operation of the channel select micom.
Figure 7:
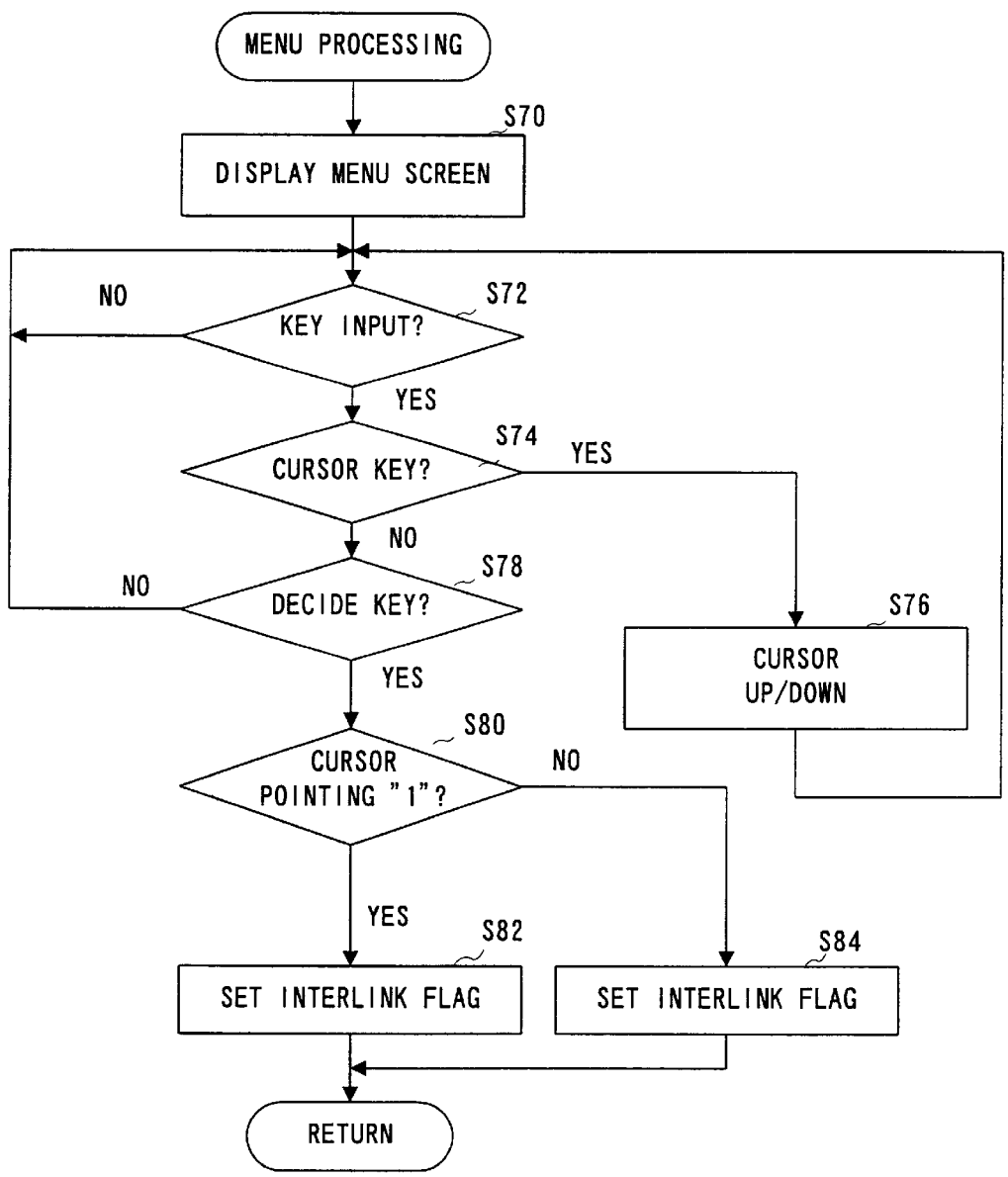
FIG. 7 is a flowchart showing still another part of the operation of the channel select micom.

Specifically, the syscon micom 66 processes a flowchart shown in FIG. 4, while the channel select micom processes a flowchart shown in FIG. 5 to FIG. 7. Referring first to FIG. 4, the syscon micom 66 in step S1 determines whether a power key 74a shown in FIG. 3 was operated or not. If "YES", it is determined in step S5 whether an interlinking flag 66a is set or not. If it is set, in step S7 the switches SW1–SW4 are turned on to start all the ground wave receiving circuit 16, CS digital circuit 18, video output circuit 44 and audio output circuit 46. Meanwhile, if the CS flag 66a has been reset, in step S9 the switches SW2–SW4 only are turned on to halt the supply of power to the CS digital circuit 18. That is, if the interlinking flag 66a has been set, the supply of power to the CS digital circuit 18 is turned on/off with interlinking to power key 74a operation. Incidentally, this interlinking flag 66a, where the user is not to utilize a CS broadcast, can be reset by remote control operation of the user. Ending the process of step S7 or S9, in step S11 flag information is outputted which is representative of whether an interlinking flag 66a has been set in the channel select micom 68.

Turning to FIG. 5, the channel select micom 68 determines in step S31 whether flag information was inputted from the syscon micom 66 or not. If "YES" here, in step S33 selected is an immediately preceding channel, i.e., a CS or ground wave broadcast channel that has been selected upon turning off the power last time. Then, it is determined in step S35 whether an interlinking flag 66a has been set or not. If "NO" here, it is considered whether the user is not to utilize a CS broadcast and the process advances to step S37. This step determines whether a key operation was made or not. If "YES", it is determined in step S39 whether that was a menu key operation 74 or not. If "YES", in step S41 a menu process is made and the process returns to step 37. However, if "NO", it is determined in step S43 whether the operated key is a numerical key 74f or not. If "YES", in step S45 conducted is a signal receiving process over a desired ground wave broadcast channel according to the numerical key and the process returns to step S37. However, if "NO", the key operation in step S37 is considered to have no bearing on a selection of a ground wave broadcast channel, and the process returns to step S37 without performing any processing.

Meanwhile, if "YES" is determined in step S35, in steps S47–S55 similar processes are made to those of steps S37–S45. If "NO" is determined in step S53, the process returns to step S47 through the processes of steps S57–S65. That is, if "NO" in step S53, in steps S57 and S59 the CS key 74b and the numerical key 74f were operated are respectively determined. If "NO" in any one of them, the process returns to step S47. However, if "YES" in both then in step S61 a desired CS broadcast channel is selected according to that operation. Then in step S63 a broadcast mode is determined for the selected channel, i.e., which is one of a usual broadcast, a radio broadcast channel and a data broadcast channel. In step S65 a result of the determination (broadcast mode information) is outputted to the syscon micom, 66, and the process returns to step S47.

Figure 8:
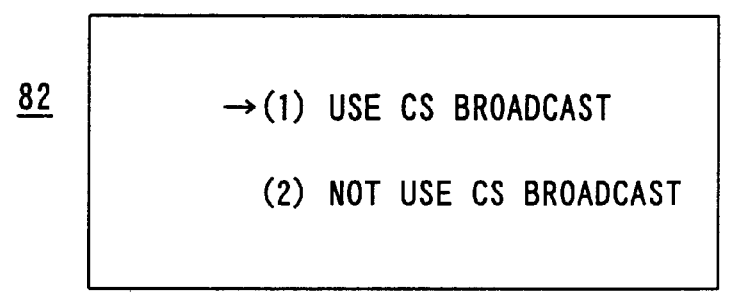

In step S41, S51, the channel select micom 68 processes a subroutine shown in FIG. 7. That is, first in step S70 a menu screen is displayed on a display 82, as shown in FIG. 8. It is determined in step S72 whether or not there was a key operation. If "YES" here, in step S74, it is determined whether or not the operated key is a cursor key 74d. If "YES", a cursor displayed on the display 82 is moved up/down according to a cursor key 74d operation, and the process returns to step S72. On the other hand, if "NO" in step S74, it is determined in step S78 whether or not the operated key is a decide key 74e. If "NO", the key operation is invalidated and the process returns to step S72. However, if "YES", it is determined in step S80 whether or not the cursor is pointing at (1) of the menu displayed on the display 82. If "YES", it is considered that the user is to utilize a CS broadcast, and in step S82 an interlinking flag 66a is set and process returns. If "NO" in step S80, it is considered that the user is not to utilize a CS broadcast, and in step S84 the interlinking flag 56a is reset and the process returns.

Referring back to FIG. 4, the syscom micom 66 determines in step S13 whether or not broadcast mode information was inputted from the channel select micom 68. If "NO", it is determined in step S15 whether or not the power key 74a was operated. If "NO", the process returns to step S13. However, if "YES", in step S27, the supply of power to the ground wave receiving circuit 16, CS digital circuit 18, video output circuit 44 and audio output circuit 46 is ceased, ending the process. On the other hand, if in step S13 broadcast mode information was inputted is determined, it is determined in step S17 whether or not the CS broadcast channel selected by the channel select micom 68 is a usual broadcast channel. If "YES", the switches SW3 and SW4 in step S19 are turned on, thereby starting up the video output circuit 44 and audio output circuit 46, and the process returns to step S13. On the other hand, if "NO" in step S17, it is determined in step S21 whether the selected channel is a CS broadcast channel or a radio broadcast channel. If "YES" here, broadcast will be only in sound. Accordingly, the switch SW4 is turned off, and the process returns to step S13. If "NO" in step S21, a broadcast to be received is considered a data broadcast, and in step S25 both the switches SW3 and SW4 are turned off and the process returns to step S13.

In this manner, where the CS flag 66a is reset, the syscon micom 66 suspends the supply of power to the CS digital circuit 18 so as to not be utilized by the user. Also, even when the CS flag 66a is set, if the selected CS broadcast channel is a radio broadcast channel, the supply of power to the video output circuit 44 is suspended. If the selected CS broadcast channel is a data broadcast channel, supply of power to both the video output circuit 44 and the audio output circuit 46 is suspended. Accordingly, power is supplied only to the required circuits, thereby preventing against useless power consumption.

In this connection, the power to the CS digital circuit 17 if turned off would offer a power save of approximately 20 W, while the power to the video output circuit 44 (CRT 52) if turned off give a power savings of about 100 W.

In the meantime, the digital television broadcast above is a system wherein a viewer, by paying a fee, can schedule to view or record a program. The scheduling includes a view scheduling for scheduling solely to view a program, a record scheduling for scheduling solely to record onto a video recording apparatus, and a view-and-record scheduling for scheduling to both view and record a program. An embodiment of the present invention will be explained below which is well suited for a program scheduling system as stated above and which is capable of preventing against useless power consumption.

Figure 9:
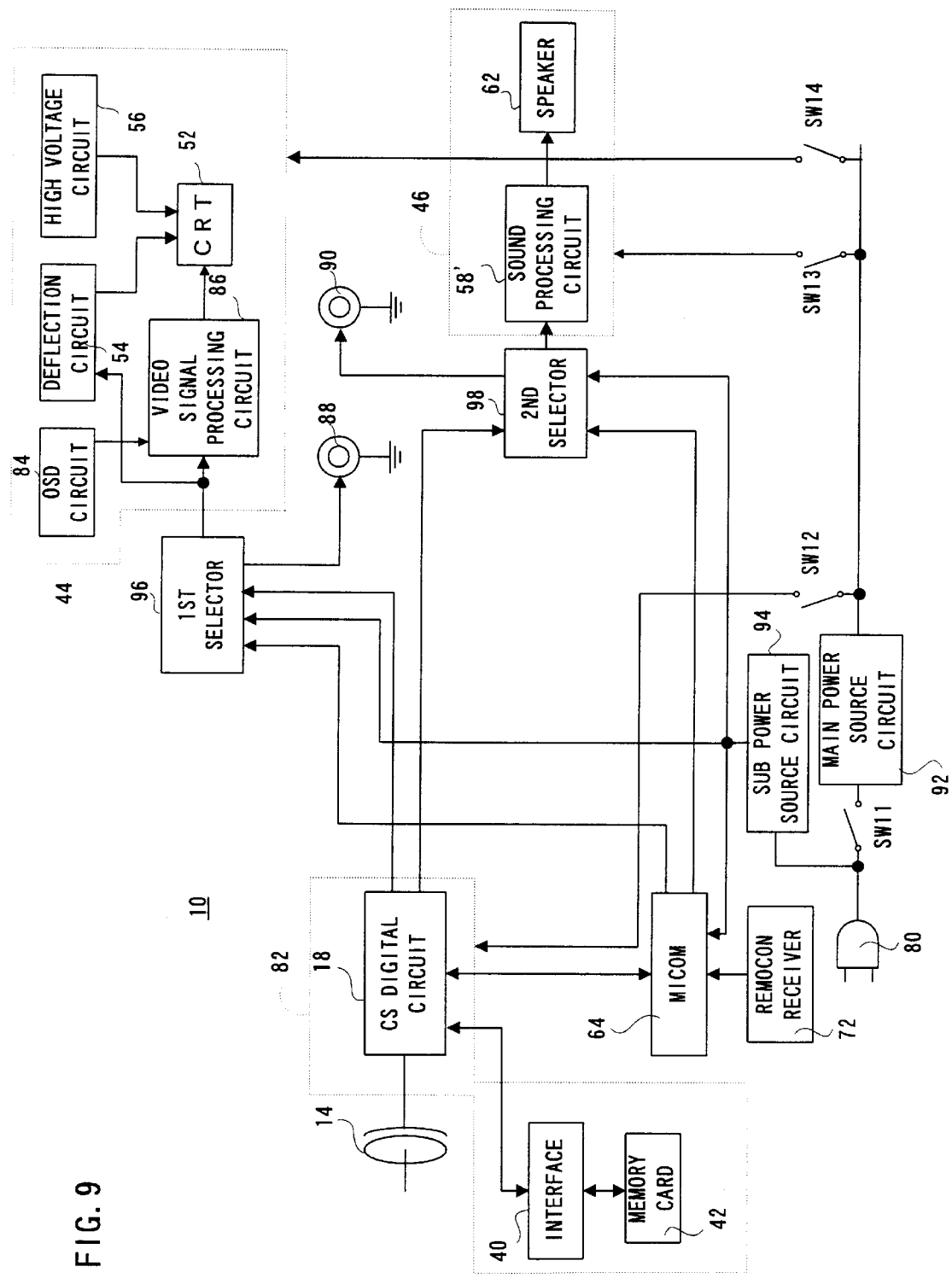
FIG. 9 is a block diagram showing another embodiment of this invention.

FIG. 9 is a block diagram showing another embodiment of the present invention. 14 is a CS antenna to receive CS (Communication Satellite) broadcasts, 18 is a CS digital circuit to receive a CS digital broadcast, 40 is an interface to input and output data to and from the CS digital circuit, 42 is a memory card memorized with data on a user subscribed to digital broadcast, 82 is a CS receiving section configured by the CS digital circuit 18 and the interface 40 and the memory card 42. 84 is an OSD (On Screen Display) circuit to generate a character signal such as a letter signal, 54 is a deflecting circuit, 56 is a high voltage circuit, 86 is a video signal processing circuit, 52 is a CRT (Cathode Ray Tube), 44 is a display section (video output circuit) to process these video signals and display video images. 58 is a sound processing circuit, 62 is a speaker, 46 is a sound processing section (audio output circuit),configured by the sound processing circuit 58 and the speaker 62.

Also, 88 is a video output terminal, 90 is an audio output terminal, 64 is a micro-computer (hereinafter referred to as "micom"), 72 is a remocon receiver with which a user can give various instructions to the television receiver, 80 is an AC power supply plug receptacle, 92 is a main power circuit for supplying power to the television receiver CS receiving section 82, display section (video output circuit) 44 and audio output circuit 46, 94 is a sub power circuit for supplying power at all times, 96 is a first selector for selecting video output, 98 is a second selector for selecting audio output, SW11 is a main power supply which, SW12 is a switch for cutting off supply of power through the CS receiving section 82, SW13 is a switch for cutting off supply of power to the audio output circuit 46, SW14 is a switch for cutting off supply of power to the audio output circuit 44.

Then the operation will be explained. If the micom 64 selects a user-desired channel according to a user instruction given from the remocon receiver 72, a CS digital broadcast signal received through the antenna 14 is delivered to the CS tuner 26 shown in FIG. 2. As a result of this, a broadcast signal through the selected desired program channel is processed sequentially by the QPSK demodulating circuit 28, descrambler 30 and demultiplexer 32. The MPEG decoder 34 creates audio and video data based on an output from the demultiplexer 32. The audio data is converted into an analog audio signal by the audio D/A converter 36, while the video data is converted into an NTSC format video signal (luminance signal and chrominance signal) by the NTSC encoder 38.

Incidentally, in the CS broadcast, there are provided, besides a communication broadcast channel to simultaneously broadcast both video and audio, a radio broadcast channel to broadcast only audio and a data broadcast channel to broadcast data such as computer programs. When the CS tuner 26 selects a data broadcast channel, the data contained in the channel is outputted from the descrambler 30 onto a personal computer (not shown) or the like via the interface 40. Also, when the CS tuner 26 receives video broadcast channel, the NPEG decoder 34 outputs only audio data.

The video signal outputted from the CS digital circuit 18 is outputted through the first selector 28 to the video signal processing circuit 86, and video image thereof is displayed on the CRT 52. Also, the deflecting circuit 54 extracts a synchronous signal from the video signal in the first selector 96 to cause the CRT 52 to effect deflection. The high voltage circuit 56 supplies a high voltage to the CRT 52. Meanwhile, the OSD circuit 86 generates a character signal according to an instruction given from the micom 64, and supplies it to the video signal processing circuit 86 whereby the video signal is superposed upon by the character signal.

On the other hand, the audio signal outputted from the CS digital circuit 18 is outputted to the audio output circuit 46 through the second selector 98 thereby outputting audio sound through the speaker 62.

Also, the first selector 96 and the second selector 98 are controlled by micom 64 so that they can give an output to the video output terminal 88 and audio output terminal 90 according to a user's instruction through the remocon receiver 72. The video output terminal 88 and audio output terminal 90 are connected, for example, to a (not-shown) video recording apparatus, such as VTR, to record the video signal through the video output terminal 98 as well as the audio signal through the audio output terminal 90.

On the other hand, as for the power supply, a commercial power from the AC power plug receptacle 80 is inputted through the main switch SW1 to the main power circuit 92. The main power circuit 92 supplies a power voltage via the switch SW12 to the CS receiving section 82, a power voltage to the audio output circuit 46 via the switch SW13, and a power voltage to the display section (video output circuit) 44 via the switch SW14. These power supply switches SW1, SW12, SW13 and SW14 are on/off-controlled by micom 64 so that they are turned on/off depending upon a state of program viewing to thereby cut off supply of power voltage to a needless circuit.

Meanwhile, the commercial power from the AC power plug receptacle 80 is also supplied to the sub power circuit 94 so that the micom 64, first selector 94, and the second selector 98 are supplied by power voltage at all times and placed in an active state.

This digital broadcast allows the user to schedule a program to be aired in the future. By selecting such a program, selection is further possible among only viewing, viewing with recording on VTR, and recording using VTR. If a view scheduling has been made, when a program start time is reached, program video images will be automatically displayed on the CRT 52 of the television receiver. If a record scheduling has been made, recording can be made by automatic outputting through the video output terminal 88 and audio output terminal 90.

Figure 12:
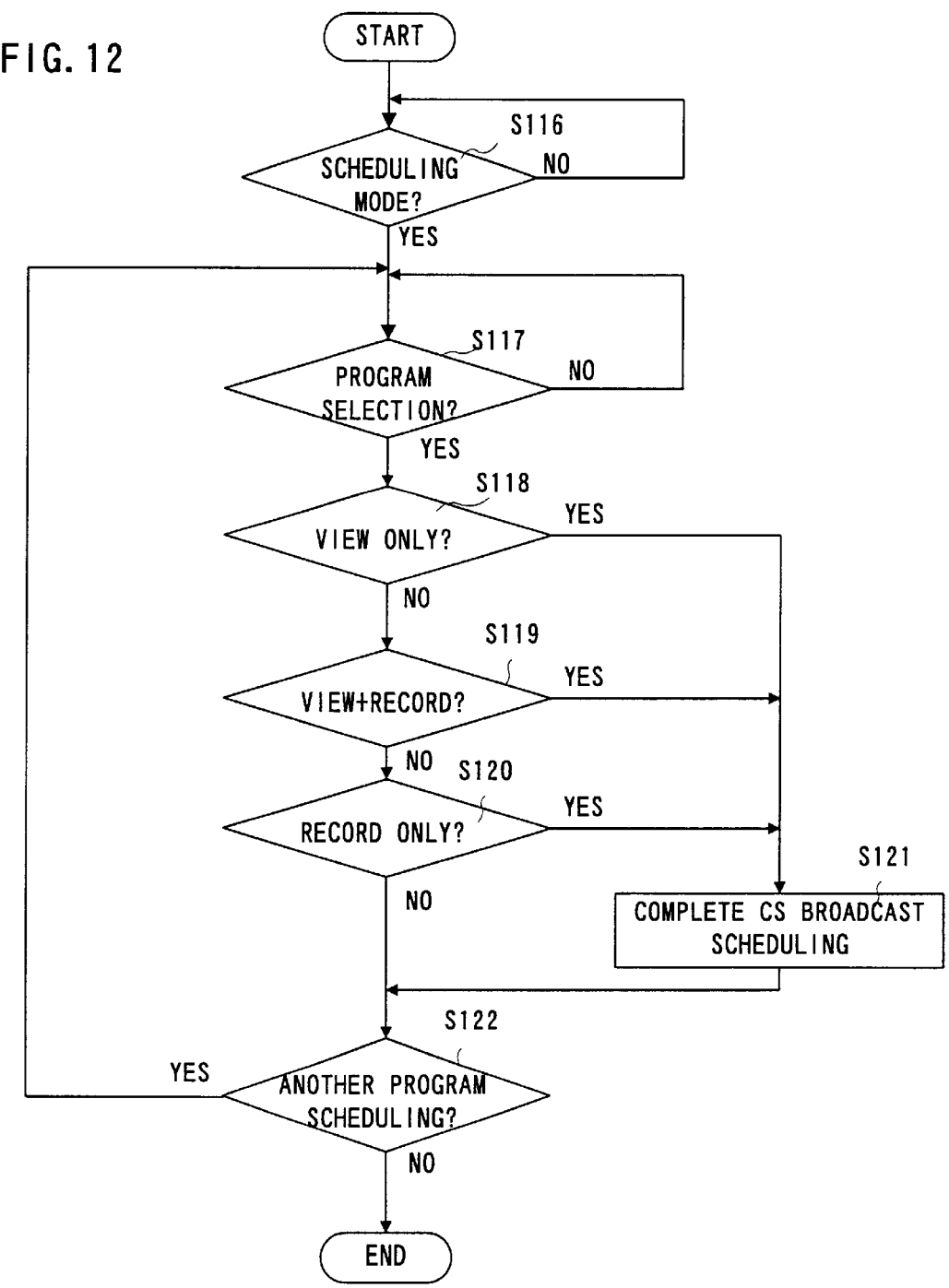
FIG. 12 is a flowchart showing operations for scheduling in the FIG. 9 embodiment.

Here, the operation will be explained in detail on a scheduling for a CS digital broadcast program, with reference to flowchart of FIG. 12. First, if a user instructs a program scheduling through the remocon receiver 72, the micom 64 enters to a scheduling mode. Under the control of the micom 64, a scheduling mode screen as shown in FIG. 17(A) is displayed on the CRT 52 according to a letter signal given from the OSD circuit 84 (S116).

If a program is selected (e.g., "AAA" displayed as shown in FIG. 17(A)), an airing time is automatically inputted (S117). Because the time is fixed on a program basis and further airing time data has been transmitted, merely selecting a program provides a time setting in an automatic manner: e.g., in the case of an airing time of 12 o'clock to 13 o'clock of FIG. 17(A), display is given as "12:00 to 13:00". Then, the user sets whether to select this program only for viewing (S118), viewing and recording it to VTR concurrently (S119), or only recording it onto VTR (S120). For example, if view only is set as shown in FIG. 17(A), then displayed is "VIEW SCHEDULING". This completes the CS digital broadcast program scheduling (S121). Furthermore, if another program is desired to plot scheduling, the user may select a program through the remocon receiver 72 and repeats the above operation (S122).

Incidentall y, where a scheduling of other than view only has been set, "VIEW+RECORD" is displayed for a view scheduling with a record scheduling, and "RECORD SCHEDULING" is displayed for a record scheduling, as shown in FIG. 17(A).

Figure 10:
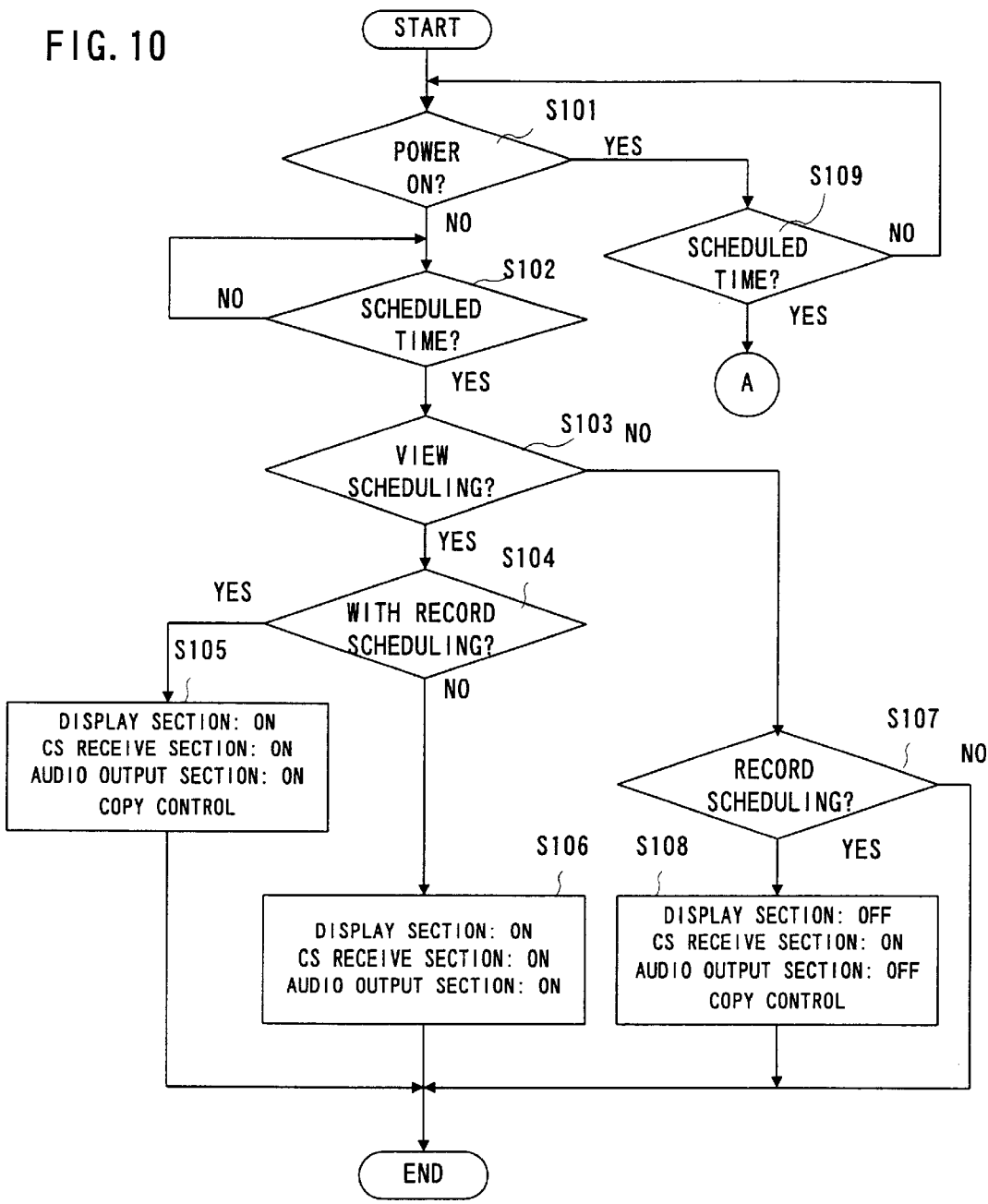
FIG. 10 is a flowchart showing an operation to execute a scheduled content in the FIG. 9 embodiment.

Next, explained is the operation of the television receiver when a scheduled content is executed, with reference to flowcharts of FIG. 10 and FIG. 17. First, in a state that no digital broadcast is viewed on the television receiver, the main power switch SW11 is off (S101). At this time, the micom 64 determines whether or not the current time has reached a user scheduled time (S102). If it has reached a scheduled time, it is determined whether or not the scheduling is a view scheduling (S103). If it is a view scheduling, it is determined whether or not a record scheduling has also been made (S104). If a record scheduling has been made, the micom 64 turns on the power switch SW11 and turns the switches SW12, SW13 and SW14 on to supply power to the CS receiving section 82, display section 44 and audio output circuit 46. The first selector 96 and the second selector 98 respectively output digital broadcast video and audio signals to the display section 44, the audio output circuit 46, the video output terminal 88 and the audio output terminal 90. Also, the CS digital circuit 18 releases copy protect from the video signal and performs copy control to output a video signal for enabling record. In this manner it is possible to view and record the digital broadcast program having been scheduled on the television receiver (S105).

If not a record scheduling (S106), the micom 64 turns the power switch SW11 on, and the switches SW12, SW13 and SW14 on to supply power to the CS receiving section 82, display section 44 and audio output section 46. The first selector 96 and the second selector 98 respectively output a digital broadcast video signal and an audio signal only to the display section 44 and the audio output section 46. This enables only viewing (S106).

Also, where only a record scheduling has been made without view scheduling (S107), the micom 64 turns the power switch SW11 on and the switch SW12 on to supply power only to the CS receiving section 82 while turning off the switches SW13 and SW14 not to supply power to the display section 44 and the audio output section 46. The first selector 96 and the second selector 98 respectively output a digital broadcast video signal and an audio signal only to the video output terminal 88 and the audio output terminal 90. Furthermore, the CS digital circuit 18 releases copy protect from the video signal to enable recording, and performs copy control to output a video signal for enabling recording. In this manner, it is possible to record the digital broadcast program having been scheduled on the television receiver (S108).

Figure 11:
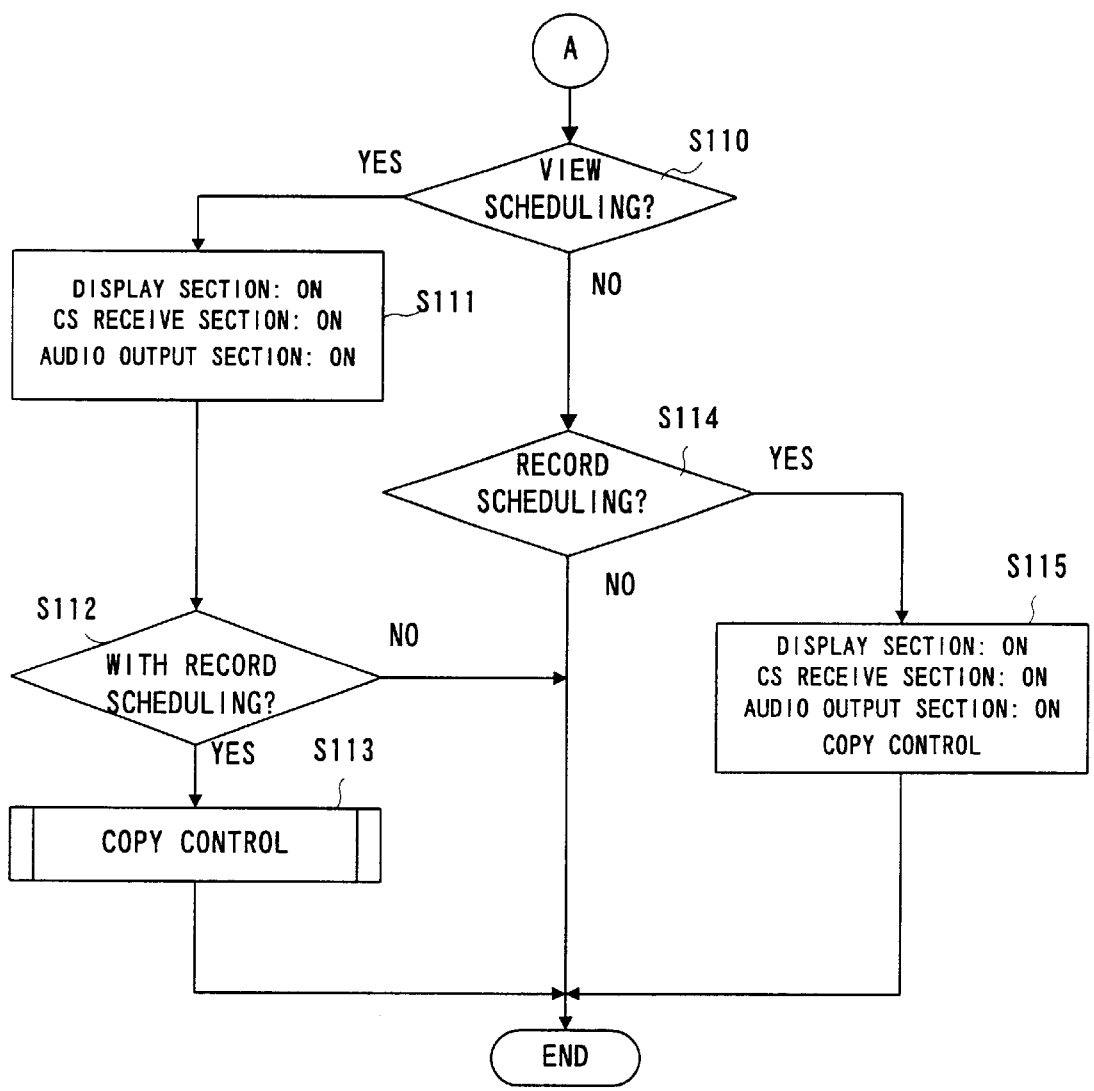
FIG. 11 is a flowchart showing the operation to execute the scheduled content in the FIG. 9 embodiment.

On the other hand, where the main power switch SW11 is on and a digital broadcast is being viewed or recorded (S101), the micom 64 determines whether or not the current time has reached a user scheduled time (S109), entering the operation of the flowchart shown in FIG. 11.

If a scheduled time is reached, it is determined whether or not the scheduling is a view schedule (S110). If a view scheduling, the micom 64 turns the switches SW13 and SW14 on, and if not already turned on, to supply power to the CS receiving section 82, display section 44 and audio output section 46. The first selector 96 and the second selector 98 respectively output a digital broadcast video signal and an audio signal to the display section 44 and the sound processing section 46, thereby enabling the digital broadcast program to view (S111). Incidentally, the switch SW12 is kept on simultaneously he main power switch SW11 is being turned on.

Furthermore, in addition to a view scheduling it is determined whether or not a record scheduling has also been made (S112). If a record scheduling has also been made, the micom 17 controls the first selector 96 and the second selector to output a digital broadcast video signal and an audio signal also to the video output terminal 88 and the audio output terminal 90. Also, the CS digital circuit 18 releases copy protect from the video signal to enable recording, and makes copy control to output a video signal for enabling recording (S113). In this manner, it is possible to view and record a scheduled digital broadcast program by the television receiver. In this case, if a letter signal, e.g., a message "SCHEDULED RECORDING STARTED", indicative of starting a scheduled recording is superposed over a video signal generated from the OSD circuit 84 and viewed on the CRT 52 screen to notify it to the user, the user can recognize start of recording.

Also, where only a record scheduling has been made without a view scheduling (S114), the micom 64 keeps the switch SW12 on to supply power only to the CS receiving section 82 and turns off the switches SW13 and SW14. The first selector 96 and the second selector 98 output a digital broadcast video signal and an audio signal only to the video output terminal 88 and the audio output terminal 90. Furthermore, the CS digital circuit 18 releases copy protect from the video image to enable recording and makes copy control to output a video signal for enabling recording (S115). Incidentally, at a start of recording no power voltage becomes supplied to the display section 44. Nothing becomes displayed on the screen, and the user will be anxious about it as a fault. Accordingly, a letter signal, e.g. "SCHEDULED RECORDING START" indicative of starting scheduled recording, is generated from the OSD circuit 84 onto the CRT 52 screen, thereby notifying the user (at this time power voltage is being supplied to the display section 44).

Figure 18:
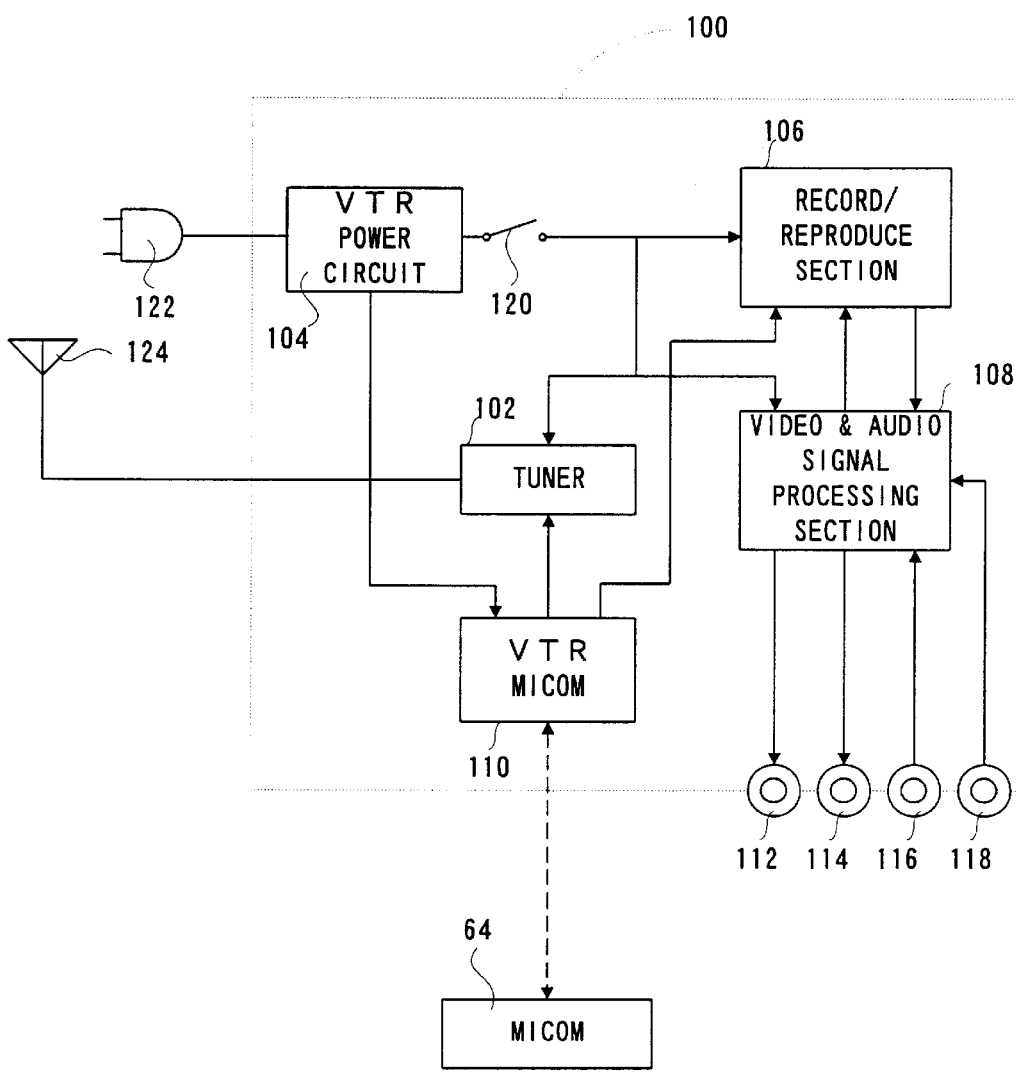
FIG. 18 is a block diagram showing a VTR configuration.

In the meanwhile, where a record scheduling has been made, video and audio signals are inputted through an external output to a VTR 100 shown in FIG. 18. This VTR 100 is configured by a tuner, a VTR power circuit 104, a recording/reproducing section 106 for recording/reproducing on and from a magnetic tape, a video/audio signal processing section 108 for processing video and audio signals, a VTR micom 110 for controlling the VTR 100, a video input terminal 112, an audio input terminal 64, a video output terminal 116, an audio output terminal 118 and a VTR power switch 120. Accordingly, when recording the above record-scheduled program, the VTR 100 should be previously set, in its timer, with a scheduling of the same as the record scheduled time to enable recording video and audio signals to be externally inputted. When the record scheduled time is reached, the micom 110 of the VTR 100 turns on the VTR power switch 120 so that the VTR power circuit 104 for creating a power voltage from the commercial power supply through the AC power plug receptacle 122 supplies power to each circuit. Thus the VTR 100 is operated to start recording. If the scheduled time is over, the VTR power switch 120 is turned off to thereby halt VTR 100 operation.

Incidentally, if the VTR micom 110 is controlled through a control line (e.g., a wired connection between VTR controlling terminals provided in a television receiver and a VTR, or an interconnection by incorporating a television receiver in a VTR) from the television receiver micom 64 in order to automatically carry out a series of the above operations, then the VTR 15 can be automatically started for recording and then stopped. This eliminates the necessity of timer scheduling for the VTR 100. Also, the VTR 100 is allowed to receive a ground wave through the antenna 124 and record video and audio signals thereof through the tuner 102.

Figure 13:
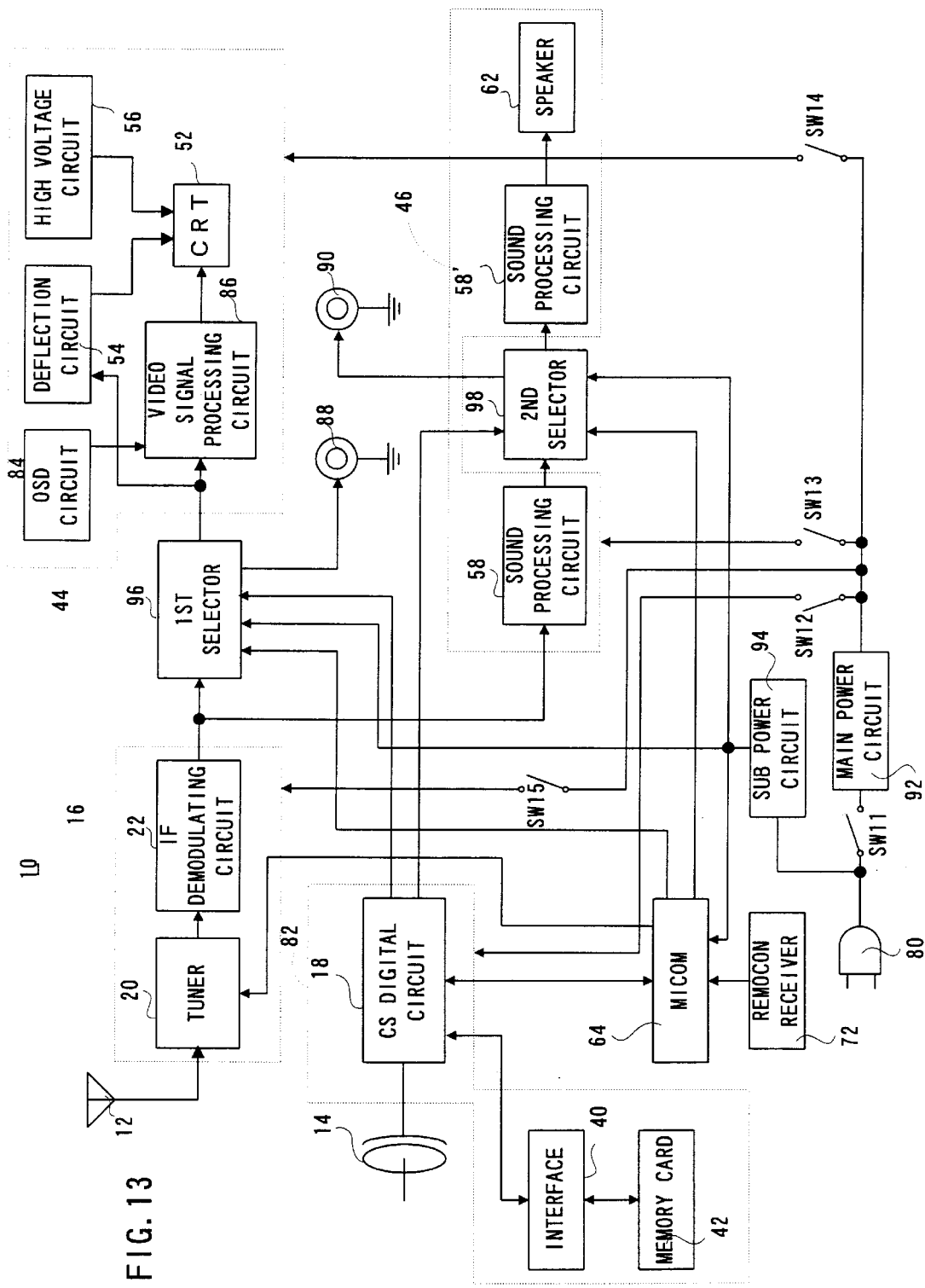
FIG. 13 is a block diagram showing still another embodiment of this invention.

Next, another embodiment will be shown in FIG. 13. This FIG. 13 embodiment is a television receiver configured to receive ground waves, contrary to the FIG. 9 embodiment. Accordingly, the same reference numerals as those of the FIG. 9 block diagram denote same elements, and the explanations thereof are omitted to explain only different points. In comparison to FIG. 9, FIG. 13 is added with a ground wave antenna 12, a ground wave receiving section 16 configured by a ground wave tuner 20 and an IF demodulating circuit 22, an audio processing circuit 58 for processing a ground wave audio signal to an audio output section 46, and a power switch SW15 for turning on/off power voltage to be supplied to the ground wave receiving section 16. Also, the first selector 96 and the second selector 98 are arranged to switch ground wave broadcast signals. Also, modification is made to software for the micom 64.

Figure 14:
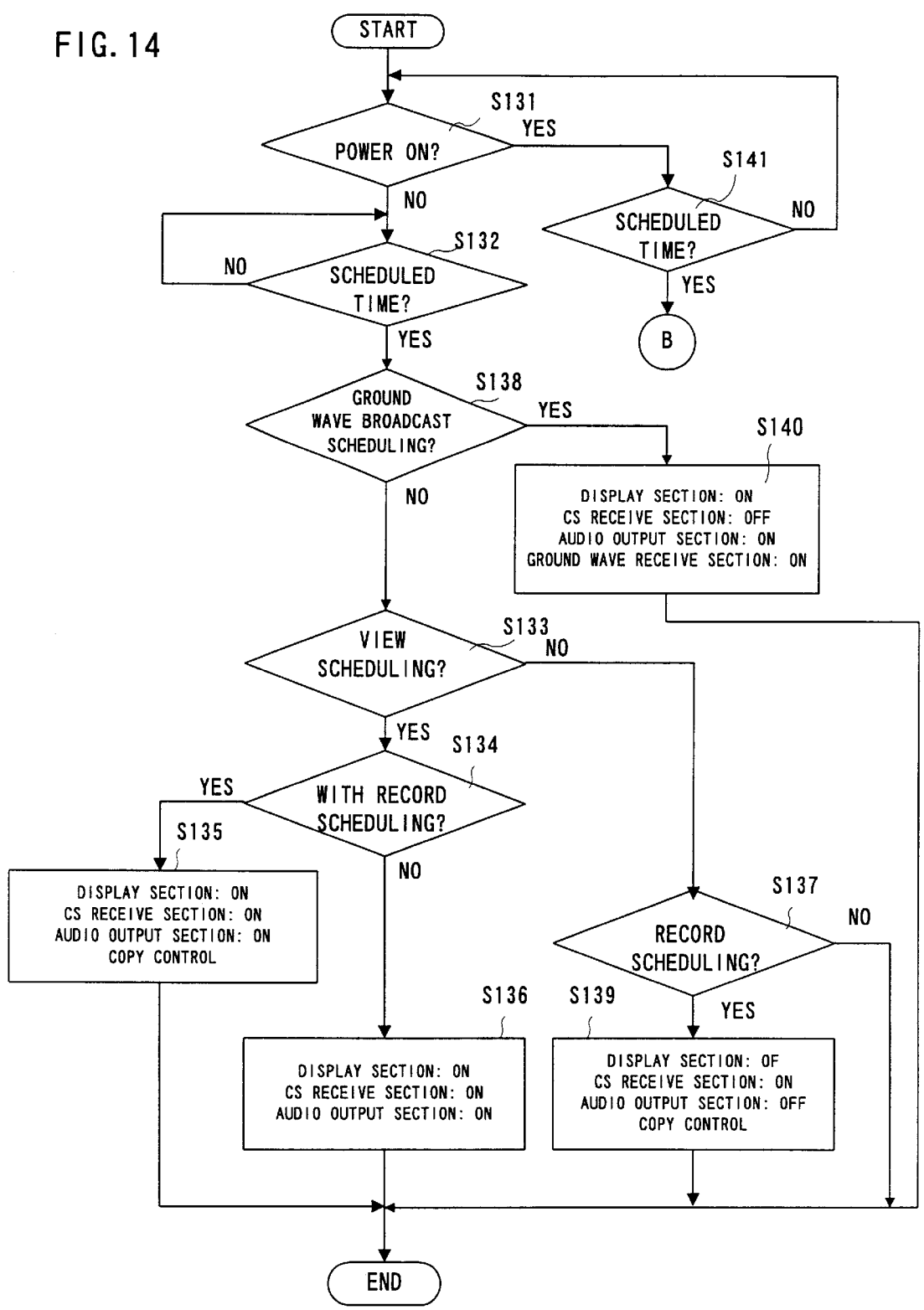
FIG. 14 is a flowchart showing an operation to execute a scheduled content in the FIG. 13 embodiment.

The operation of this micom 66 will be explained using flowchart of FIG. 14, FIG. 15 and FIG. 16. First, the scheduling operations of CS digital and ground wave broadcast programs are explained, with reference to FIG. 16. If the user sets a scheduling mode through the remocon receiver 72 (S150), a screen shown in FIG. 17(B) appears. The user can select either of a CS digital broadcast program scheduling or a ground wave program scheduling (S151). If a CS digital broadcast program scheduling is selected, a program is selected (S152). Thereafter, performed is a view scheduling, view-and-record scheduling or record scheduling. The operation of from the step S118 to S122 are the same as those of FIG. 12.

Meanwhile, for a ground wave broadcast program scheduling a screen as shown in FIG. 17(C) appears so that the user can plot a scheduling by inputting a time and channel through the remocon receiver 72 (S153). In this manner, it is possible to plot a scheduling for CS digital broadcast and ground wave programs.

On the other hand, the operation of television receiver when executing a scheduled content will be explained with reference to flowcharts of FIG. 14 and FIG. 15. First, in a state that a digital broadcast or ground wave broadcast is not being viewed on the television receiver, the main power switch SW11 is off (S131). At this time, the micom 64 determined whether or not the current time has reached a time scheduled by the user (S132). If the scheduled time is reached, then it is determined whether the same scheduling is on a ground wave scheduling or a CS digital broadcast scheduling (S138).

If the scheduling is on a CS digital broadcast scheduling, it is determined whether or not the same is a view scheduling (S133). If a view scheduling, it is determined whether or not a record scheduling has also been made (S134). If a record scheduling has also been made, the micom 64 turns the power switch SW11 on, the switches SW12, SW13 and SW14 on to supply power to the CS receiving station 82, display section 44 and audio output section 36 and output section 46, and the switch SW15 off not to supply power to the ground wave receiving station 16. The first selector 96 and the second selector 98 respectively output a digital broadcast image signal and a sound signal to the display section 44, audio output section 46, video output terminal 88 and audio output terminal 90. Also, the CS digital circuit 18 releases copy protect from the video signal to enable recording, and makes copy control to output a video signal for enabling recording. In this manner, it is possible to view and record the scheduled digital broadcast on the television receiver (S135).

If not a record scheduling (S134), the micom turns the power switch SW11 on, the switches SW12, SW13 and SW14 on to supply power to the CS receiving section 82, display section 44 and audio output section 46, and the switch SW15 off not to apply power to the ground wave receiving section 16. Then the first selector 96 and the second selector output a digital broadcast video signal and an audio signal only to the display section 44 and audio output section 46. This enables solely viewing (S136).

Also, where only a record scheduling is made without a view scheduling (S137), the micom 64 turns the power switch SW11 on, the switch SW12 on to supply power only to the CS receiving section 82, and the switches SW13, SW14 and SW15 off to not supply power to the display section 44, audio output section 46 and ground wave receiving section 16. The first selector 96 and the second selector 98 output a digital broadcast video signal and an audio signal only to the video output terminal 88 and audio output terminal 90. Furthermore, the CS digital circuit 18 releases copy protect from the video signal to enable recording, and makes copy control to output a video signal for enabling recording. In this manner, it is possible to record the scheduled digital broadcast program on the television receiver (S139).

Furthermore, if the scheduling is on a ground wave broadcast (S138), the micom 64 turns the power switch SW11 on, the switches SW13, SW14 and SW15 on to supply power to the ground wave receiving section 16, display section 44 and audio output section 46, and the switch SW12 off not to supply power to the CS receiving section 82. The first selector 96 and the second selector 98 respectively output a ground wave broadcast video signal and an audio signal to the display section 44, audio output section 46, video output terminal 88 and audio output terminal 90 (S140).

Figure 15:
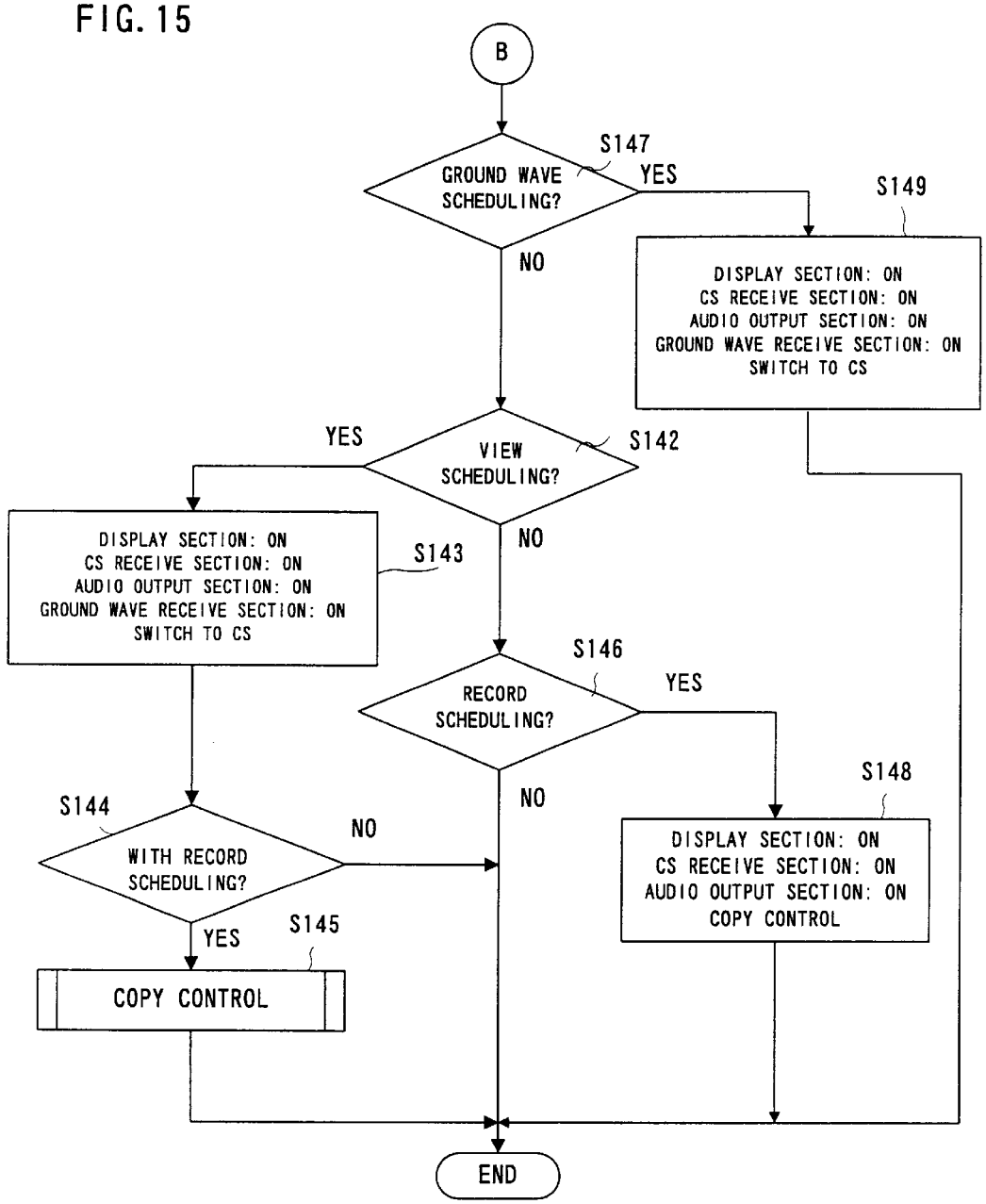
FIG. 15 is a flowchart showing the operation to execute the scheduled content in the FIG. 13 embodiment.
Figure 16:
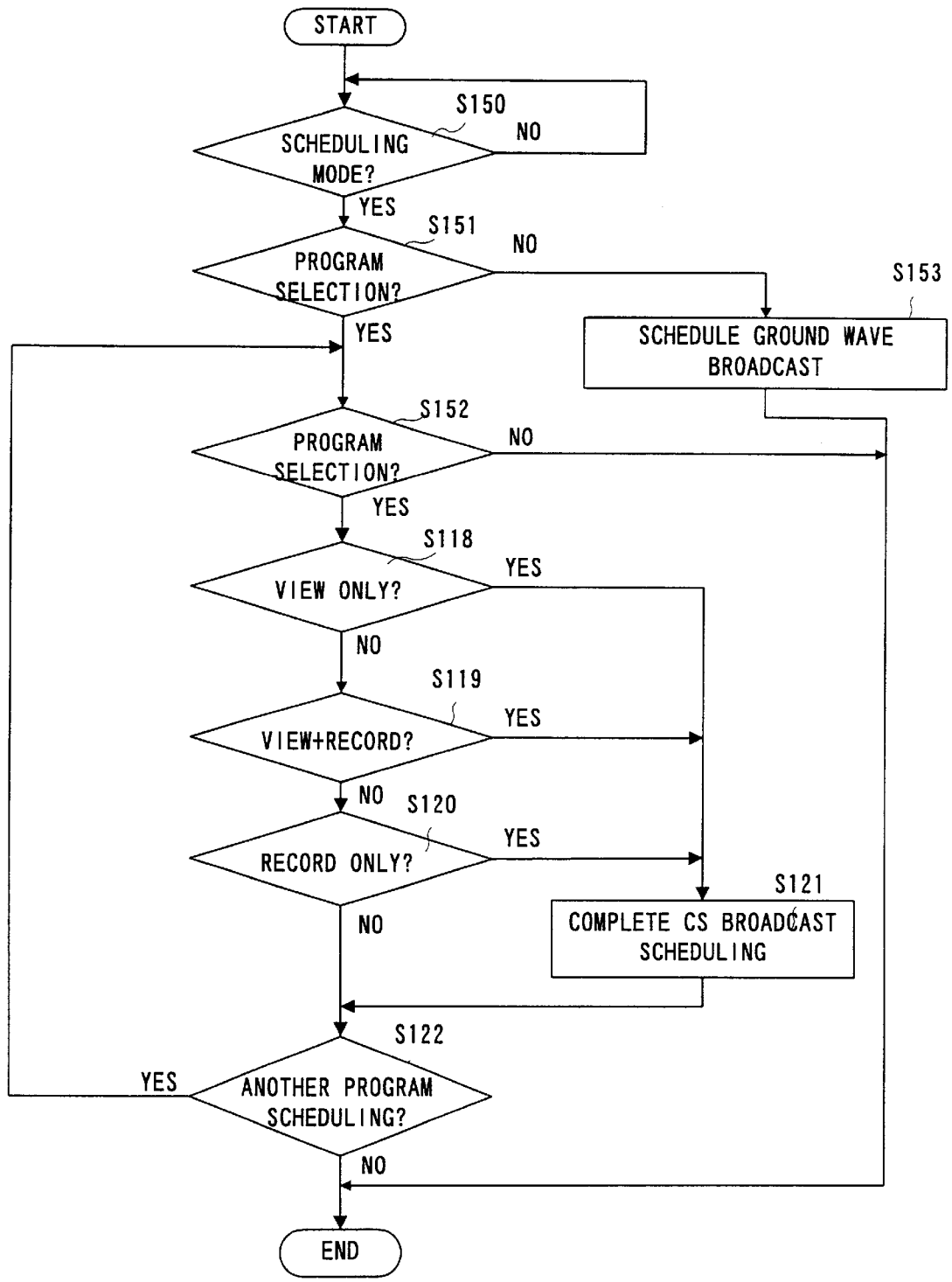
FIG. 16 is a flowchart showing operations for scheduling in the FIG. 13 embodiment.

On the other hand, when a digit broaadcast or ground wave broasdcast is being viewed with the main power SW11 turned on (S131), the micom 64 at this time determines whether or not the current time has reached a time scheduled by the user (S141) and the process enters to the flowchart shown in FIG. 15.

If the scheduled time has been reached, it is determined whether the same scheduling is on a ground wave broadcast scheduling or a CS broadcast scheduling (S147). If on a CS broadcast scheduling, then it is determined whether or not the same scheduling is a view scheduling (S142). If a view scheduling, the micom 64 turns the switches SW12, SW13 and SW14 on, if they are not already turned on, to supply power to the CS receiving section 82, display section 44 and audio output section 46, and the switch SW15 off not to supply power to the ground wave receiving section 16. The first selector 96 and the second selector 98 output a digital broadcast video signal and an audio signal to the display section 344 and the audio output section 46 to enable viewing a digital broadcast program (S143).

Furthermore, if is also dertermined whether not a record scheduling has been made on the digital broadcast program (S144). If a record scheduling has also been made, the micom 64 controls the first selector 96 and the second selector 98 to output a video signal and an audio signal to the video output terminal 88 and the audio output terminal 90. Meanwhile, in the CS digital circuit 18, copy control is made to release copy protect of the video signal to enable recording and to output a video signal for enabling recording (S145). In this manner, it is possible to view and record the digital broadcast program scheduled on the television receiver. At this time the OSD circuit 84 generates a letter signal, "SCHEDULED RECORD STARTED", indicative of starting a scheduled recording, to be superposed over a video signal being viewed on the CRT 52 screen thereby notifying it to the user. In a state that a record scheduled has been made and the user is viewing a CS digital broadcast, a ground wave broadcast is outputted in a forcible manner. Alternatively, it is possible to arrange so as to cut off the supply of power voltage to the ground wave receiving section 16, display section 44 and audio output section 46. signal, "SCHEDULED RECORD STARTED" indicative of starting a scheduled recording, to be superposed over a video signal being viewed on the CRT 52 screen thereby notifying it to the user. In a state that a record scheduled has been made and the user is viewing a CS digital broadcast, a ground wave broadcast is outputted in a forcible manner. Alternatively, it is possible to arrange so as to cut off the supply of power voltage to the ground wave receiving section 16, display section 44 and audio output section 46.

Meanwhile, where only a record scheduling has been made without a view scheduling (S146), the micom 64 turns the switch SW12 on to supply power to the CS receiving section 18, the switches SW13, SW14 and SW15 on to supply power also to the display section 44, audio output section 46 and ground wave receiving section 16. The first selector 96 and the second selector 98 output a ground wave broadcast video signal and an audio signal to the display section 44 and the audio output section 46, and a digital broadcast video signal and an audio signal to the video output terminal 88 and the audio output terminal 90. Furthermore, the CS digital circuit 18 releases copy protect from the video signal to enable recording and makes copy control to output a video signal for enabling recording (S148). Incidentally, when starting a record scheduling, the OSD circuit 84 generates a letter signal, e.g., a message "SCHEDULED RECORD STARTED" indicative of starting a scheduled recording onto the CRT 52 screen, thereby notifying the user.

Furthermore, for a ground wave broadcast scheduling (S147) the micom 64 turns the switches SW13, SW14 on to supply the display section 44, audio output section 46 and ground wave receiving section 16, and the switch SW12 off not to supply power only to the CS receiving section 82. It should be noted that, during performing a scheduled recording on a CS digital broadcast, the switch SW12 is turned on with the supply of power to the CS receiving section 82 kept. The first selector 96 and the second selector 98 output a video signal and an audio signal of a ground wave broadcast over a scheduled channel having been switched over, and a ground wave broadcast video signal and an audio signal to the video output terminal 88 and the audio output terminal 90. Incidentally, during performing a scheduled recording on a CS digital broadcast, a CS digital broadcast video signal and an audio signal are outputted to the video output terminal 12 and the audio output terminal 13 (S149).

Figure 19:
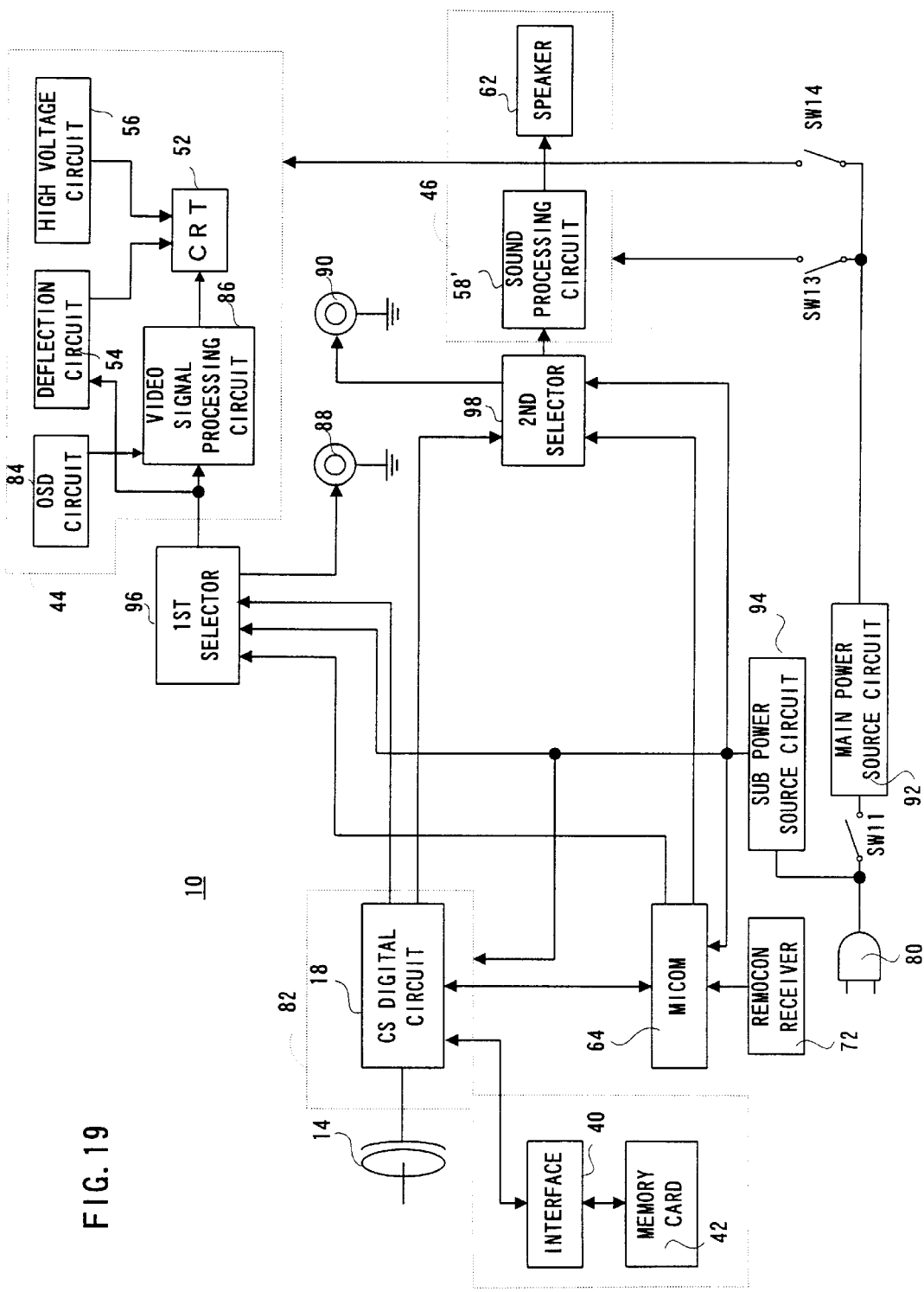
FIG. 19 is a block diagram showing still another embodiment of this invention.
Figure 20:
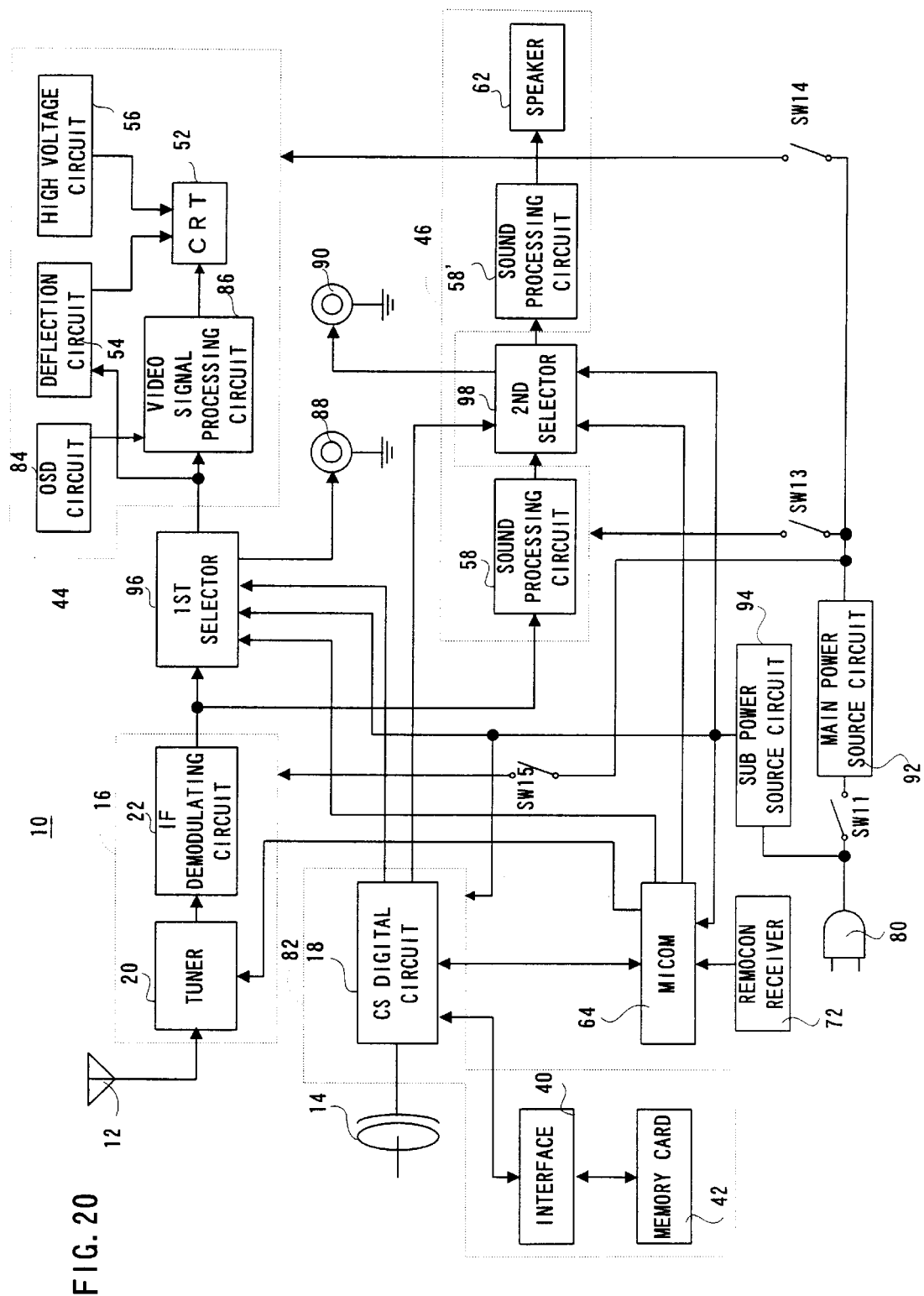
FIG. 20 is a block diagram showing further embodiment of this invention.

Incidentally, where there is a change in program airing time of a CS digital broadcast (e.g., an airing time is put off or delayed to start), the data of a changed time will be sent. Consequently, the CS receiving section 18 may be arranged to supply power at all times. This arrangement, if made, e.g., to supply power from a sub power circuit 21 as shown in FIG. 19 and FIG. 20, supplies power to the receiving section 82 at all times. Due to this, the CS receiving section can afford to receive at all times data to be sent thereto. If there is a time change, it may be reflected at a start of a scheduled time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A television receiver comprising:
   a first receiving means for receiving a digital television broadcast signal;
   a second receiving means for receiving an analog television broadcast signal;
   a mode setting means for setting an analog receiving mode to receive only the analog television broadcast signal;
   a power off means for turning off a power supply for said first receiving means when the analog receiving mode is set;
   a reception scheduling means for scheduling to receive a digital television broadcast signal by said first receiving means;
   a first power control means for controlling a power to be supplied to said first receiving means in accordance with a scheduled content by said reception scheduling means;
   a second power control means for controlling power to be supplied to said video output means in accordance with the scheduled content by said reception scheduling means;
   an audio output means for outputting an audio signal of the digital television broadcast signal received by said first receiving means; and
   a third power control means for controlling power to be supplied to said audio output means in accordance with the scheduled content by said reception scheduling means.

2. A television receiver according to claim 1, wherein when the scheduled content by said reception scheduling means is a view scheduling to view at a particular time a particular program of the digital television broadcast and that time is reached, said first power control means, said second power control means and said third power control means respectively supply power to said first receiving means, said video output means and said audio output means.

3. A television receiver according to claim 1, further comprising:

an externally output means for externally outputting the digital television broadcast signal received by said first receiving means;

an external output control means for enabling said external output means when the scheduled content by said reception scheduling means is a view-and-record scheduling to view and record at a particular time a particular program of the digital television broadcast and that time is reached.

4. A television receiver according to claim 3, wherein said external output control means enables said external output means when the scheduled content by said reception scheduling means is a record scheduling to record at a particular time a particular program of the digital television broadcast and that time is reached, and further when the particular time is reached said second power control means and said third power control means respectively cutting off power to said video output means and said audio output means.

* * * * *